United States Patent
Herman et al.

[11] Patent Number: 6,108,367
[45] Date of Patent: Aug. 22, 2000

[54] LOW POWER TWO-WAY WIRELESS COMMUNICATION SYSTEM FOR ELECTRONIC SHELF LABELS

[75] Inventors: Alex Herman, County of Norfolk, Mass.; Noam Livneh, Yuvalim, Israel

[73] Assignee: Electronic Retailing Systems, Inc., Norwalk, Conn.

[21] Appl. No.: 08/995,454

[22] Filed: Dec. 20, 1997

Related U.S. Application Data

[62] Division of application No. 08/398,905, Mar. 6, 1995.

[51] Int. Cl.⁷ .............................. H04B 15/00; H04K 1/00; H04L 27/30
[52] U.S. Cl. ............................................ 375/141; 375/133
[58] Field of Search ....................................... 375/133, 141

[56] References Cited

U.S. PATENT DOCUMENTS

| | | | |
|---|---|---|---|
| 3,701,019 | 10/1972 | Jackson ..................................... | 340/518 |
| 5,172,314 | 12/1992 | Poland et al. ............................. | 364/401 |
| 5,241,467 | 8/1993 | Failing et al. ............................ | 364/401 |
| 5,243,622 | 9/1993 | Lux et al. ..................................... | 375/1 |
| 5,245,534 | 9/1993 | Waterhouse et al. ..................... | 364/404 |
| 5,348,485 | 9/1994 | Briechle et al. .......................... | 439/110 |
| 5,374,815 | 12/1994 | Waterhouse et al. .................... | 235/383 |

FOREIGN PATENT DOCUMENTS

| | | |
|---|---|---|
| WO 93/05456 | 3/1993 | WIPO . |
| WO 93/05475 | 3/1993 | WIPO . |
| WO 94/17615 | 8/1994 | WIPO . |
| WO 94/22095 | 9/1994 | WIPO . |
| WO 94/22125 | 9/1994 | WIPO . |

OTHER PUBLICATIONS

D.H. Schaubert, "Endfire Slotline Antennas", Journees Inter-rnationales de Nice sur les Antennes, Nov. 13–15, 1990, pp. 253–265.

D.H. Schaubert, "Scanning Characteristics of Stripline–Fed Tapered Slot Antennas on Dielectric Substrates", Antenna Applications Symposium, Sep. 23–24, 1993.

*Primary Examiner*—Don N. Vo
*Assistant Examiner*—Phuong Phu
*Attorney, Agent, or Firm*—Oppedahl & Larson LLP

[57] ABSTRACT

A two-way low-power communication system for an electronic shelf label system uses a multiplicity of labels, each of which has an antenna and a diode. Data to be received at the label is Manchester encoded and 100% AM modulated onto a spread-spectrum RF signal, emitted from a broadcast antenna in the store ceiling. Preferably the RF is around 2.4 Ghz, and the spreading is via direct sequence phase shift keying with a chipping rate at least ten times the RF frequency. A 63-bit sequence may be used. The label detects the RF energy, and a simple comparator followed by a manchester decoder extrats the digital data stream. Data to be set from the label is communicated via a selective modulation of the diode with an offset signal, preferably in the range of 1 to 10.7 Mhz. During this time the ceiling broadcast antenna is emitting a spread-spectrum signal that is not data-modulated in any way. Energy re-emitted by the label antenna is picked up by a ceiling-mounted receiving antenna, and the energy is diverted to two sidebands during times when the diode is being modulated. The received signal is spread-spectrum demodulated and band-pass filtered so that only sideband energy is processed. The label's outbound data stream is recovered by digital signal processing techniques from the sideband energy. The result is a minimization of cost and complexity in the label and an optimal exploitation of the bandwidth given the regulatory framework thereof.

10 Claims, 10 Drawing Sheets

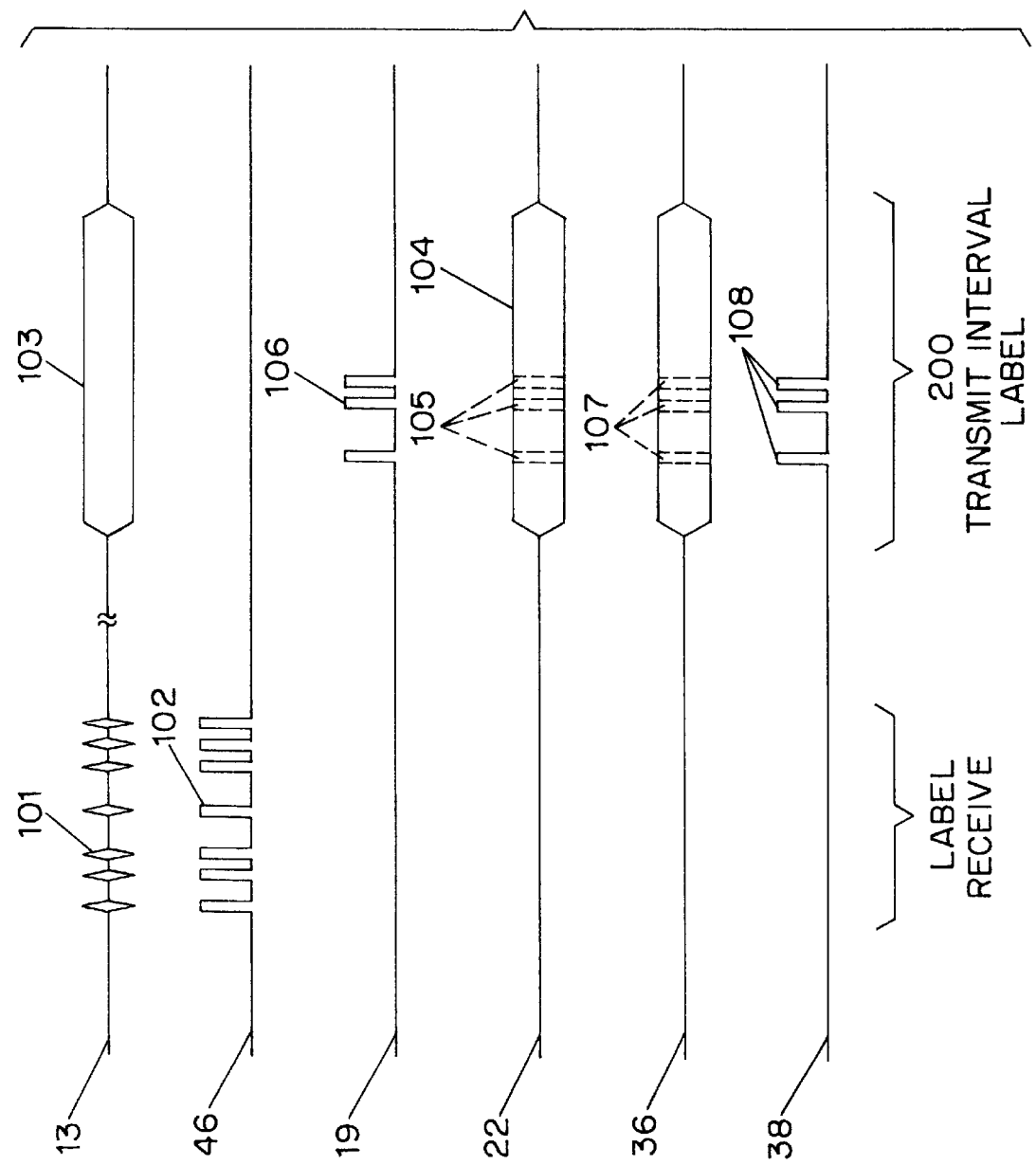

LOW POWER TWO-WAY WIRELESS COMMUNICATION SYSTEM FOR ELECTRONIC SHELF LABELS

This application which is a division of the application Ser. No. 08/398,905 filed on Mar. 6, 1995 and of which the following is a specification.

BACKGROUND OF THE INVENTION

The invention relates generally to store price display systems, and relates more particularly to low-power wireless two-way communication arrangements in such systems.

An electronic shelf label (ESL) system comprises many individual, addressable ESLs in a store, typically 15,000 or more. These ESLs are situated in areas according to the organization of the retail store. Specifically, the ESLs are along a shelf edge (in some systems mounted on a rail), and several shelves are associated vertically in a vertical bay. Several vertical bays may be logically associated as a section or category, and several sections may be positioned in a half-aisle. Rail-based systems can deliver power to the ESLs, allowing extensive communications to the ESLs limited only by the communication bandwidth. However, rail-based systems are best suited to installation on shelving units, and present installation difficulties and additional costs when installed in other areas of the retail environment such as peghook displays, produce areas, free-standing display tables, deli and meat display cases, wire bins (such as for bakery products), and other general merchandise areas. For these areas, an ESL system using self powered ESLs (battery, solar, or other technologies) is highly desired because it offers installation advantages in that the ESLs may be directly attached to a variety of retail display fixtures without the impediment of wiring and the associated installation and maintenance costs.

Prior art (Pat. No. 5,241,467, Failing et. al., and Pat. No. 5,245,534, Waterhouse et. al., each assigned to the same assignee as the assignee of the present application, and each of which is incorporated herein by reference) describes means and methods to collect, maintain, and use location information on each ESL and the product it represents. This information is then used to cause all ESLs in an area or sub-area to change their displays in response to a user request initiated by a hand held unit, a special purpose module, an initiator, or a display function switch. In the current art, multiple messages must be prepared and sent, one each to each ESL in the desired area, to effect the desired display change. In a dense area, such as Health And Beauty Aids (HABA), the time necessary to address all the ESLs in a section or several adjacent vertical bays may take several tens of seconds, too long to allow for efficient in-aisle inter-activity with ESL-displayed store maintenance information, such as Computer-Aided Ordering (CAO), shelf or space management, inventory management, or promotional or merchandising information. In addition, for a power limited system, such as an RF or IR system powered by solar cells or batteries, it is desirable to minimize the number of transmissions from each ESL and, more importantly, to minimize the receiver-on time (during which the label waits for a possible message), in order to conserve power and extend battery life.

Co-pending patent application Ser. No. 08/201,470 (assigned to the same assignee as the present application and incorporated herein by reference) for Automatic Merchandising Audit Systems is directed to additional applications for shelf edge labels that also require increased communications to the labels. These applications require reasonably rapid response by the system to the operational actions being taken by the store employee in the aisle. In order to avoid long delays, and the resulting increased labor costs waiting for the label response, the receivers must all be turned on, or at least the label receivers in the geographic section in which the activity is occurring must be turned on, again consuming the energy from the battery. Co-pending application Ser. No. 08/247,334, Sub-Global Area Addressing (assigned to the same assignee as the assignee of the present application, and incorporated herein by reference), attempts to address this issue by providing means by which groups of labels may be quickly activated while minimizing the total number of labels required to have receivers on. This solution provides some benefit in trading off response time of a limited geographic area with battery life, it requires some additional software overhead to implement.

The primary limitation of a typical fully functional wireless electronic shelf label is the receiver on time. Transmissions in response to queries are typically short, perhaps tens of milliseconds, so that the total energy used in a transmission is relatively small. However, the receiver must be on for relatively long periods on order to be ready for an unexpected message, such as a price change or another display change to support in-aisle activities such as merchandising, computer aided ordering, or space management. Co-pending patent application Ser. No. 08/258,409, Low-Powered, RF-Linked Price Display System (assigned to the same assignee as the assignee of the present application, and incorporated herein by reference), addresses the power limitation by combining passive RF transceiver technology with a battery powered (or alternatively solar powered) electronic shelf label with a liquid crystal display (LCD). The technology is well known to operate such displays for the required 5 to 7, perhaps longer, years using an economical lithium coin cell. By implementing a passive RF transceiver with the ability to receive a message when energized, and alert the LCD controller through an interrupt line when receiving a message, the message can be captured by the electronic shelf label without expending any more than a minimum amount of battery energy when transferring the received data to the label. In an alternate configuration, the passive RF transceiver need not store any of the data except its own unique ID (or sub-global IDs if used), but needs only to wake up the electronic shelf label when a message is to be received.

The use of passive RF transceivers or RF diode detectors biased at acceptably low power levels requires the system transceivers communicating with the ESLs to operate at reasonably high power levels. For operation within the United States in the unlicensed ISM (instrument, scientific, and medical) bands, the radiated power is limited to less than 1 milliWatt (FCC 15.249) for unrestricted modulation implementations. Within the modulation restrictions in these bands, unlicensed radiation power levels are limited to 1 Watt (FCC 15.247). For a passive ESL transceiver, utilizing the well-known art of reflective antenna techniques for low power communications to the system transceiver, the reliability of the link is greatly dependent on the radiated power level of the system transceiver, since the energy "transmitted" by the ESL is the reflected energy received at the ESL antenna from the system transceiver. This is due to the level of received signal from the ESL at the system transceiver falling off at least as quickly as the fourth power of the range between the system transceiver and the ESL.

The radiated power level of the system transmitters can be increased, since these units are likely communicating directly with the host (by wire) and are therefore easily powered from a source connected to the AC power mains and not subjected to battery limitations. However, within the United States radiation power levels above 1 milliWatt are subject to modulation and operation restrictions, and radiation power levels above 1 Watt are not authorized. A solution is to obtain site licenses from the FCC for operation at higher power levels using the desired modulation techniques. (Not all modulation techniques are equally applicable due to the low cost and low power requirements of the ESL). Operational licenses for radiated power levels up to 8 Watts have been authorized (on an experimental basis) for this purpose. However, site licensing is not a very practical solution, since the licenses must be renewed on a regular basis (typically 5 years) on a site-by-site basis. This could present an annoying paperwork burden on a supermarket retail chain of several hundred to well over 1000 stores. Additionally, increasing health concerns by the medical authorities, government (OSHA), and consumers about the safety of microwave radiation make the decision to increase power levels arbitrarily an undesirable one. This is made worse by the fact that the desire would be to select a physical location for the system transceivers that is as low as practical in order to reduce the effects of the path loss (fourth order of range), thus placing the transmitters even closer to the consumers and store employees. An alternate solution might be to operate at lower, therefore safer, power levels, but this would require that additional system transceivers be installed in the ceiling, thus increasing the acquisition, installation, and maintenance costs of the system.

Modulation techniques used by the current technology of passive communication systems using the reflective impedance of antennas have additional limitations in the system transceiver. Typically, these systems use a double-sideband amplitude modulated (DSB AM) signal for the downlink from system transceiver (transmitter) to the ESL transceiver (receiver or detector). For uplink communications, the system transceiver continues to transmit a continuous wave unmodulated carrier signal and in the ESL, an RF device modulates the impedance of the ESL antenna with a local oscillator. Oscillator frequencies of 10 to 20 kHz are typical. The data are transmitted by applying double-sideband AM modulation to the local oscillator, thus creating modulated sidebands on either side of the carrier signal separated by the local oscillator frequency. Typical local oscillator frequencies would be about 16 kHz (easily obtained from low-cost 32.768 kHz watch crystals).

The system is further complicated by the fact that the received reflective modulation signal will typically have a signal level of less than −30 dBm, while the transmitted unmodulated carrier, which has to be operating simultaneously in order to produce the reflective modulation, will typically be operating at a power level of about +30 dBm. Since the path loss for this transmission falls off at the fourth power of range, combined with the desire to minimize the total system costs (acquisition and installation), the system transmitter and the system receiving antenna must be located in close proximity. This means that the receiver must reject a carrier signal 60 dB higher than the maximum expected receive signal, and the carrier signal distance in frequency from the center of the receiver bandwidth is of the order of the bandwidth itself. This requires extremely steep skirts on the receiver bandpass filter, or an accurate notch filter, and precludes relaxation of the carrier frequency tolerance for cost reduction purposes. Accommodation is limited, because moving the receive antenna closer to the transmitter increases the interference from the carrier, and increasing the separation reduces the received reflective signal.

What is desired is a transmission scheme that radiates at lower power levels to be safe for consumers and store employees, does not require site licensing, has reasonable coverage to minimize the number of system transceivers needed to cover an area of interest (the store), and still provides reliable communications at low cost and low power levels with a battery powered ESL (electronic shelf label).

SUMMARY OF THE INVENTION

The invention consists of a system the elements of which include one or more (typically ceiling-mounted) transceivers and a multiplicity of ESL (or tag) receivers/retroreflectors. The system transceiver transmitted signal is a double sideband amplitude modulated (ON-OFF Keyed) transmission with an underlying Direct Sequence Spread Spectrum (DSSS) Pseudo-Random sequence of N chips (N>10) for each data bit that modulates the carrier (preferably around 2.4 Ghz) in Binary Phase Shift Keying (BPSK). Another way to describe the chipping rate is that it is desirably at least ten times that of the data rate. The ON-OFF keyed modulation for the information to be transmitted to the ESLs preserves the average duty cycle of the carrier regardless of the information transmitted through Manchester encoding. The transmitter operates in accordance with FCC Parts 15.247, 15.205, and 15.209, keeping the radiated power level below 1 Watt and meeting the requirements for unlicensed operation.

The invention employs a low-cost ESL "receiver", consisting of a simple antenna tuned to the center frequency (the above-mentioned 2.4 GHz for example), a low-cost Schottky or PIN diode, a crystal oscillator using a 1 to 10 MHz crystal (with a tolerance of ±100 parts per million), and some passive components. The front end contains an antenna and diode. The diode functions as a detector for RF reception, and (as will be described below) functions also as a mixer and modulator for uplink response. When the ESL receives, the RF energy collected by the tuned antenna is detected by the slightly biased diode. As mentioned previously, the downlink data modulation is ON-OFF keying. The diode, in conjunction with the demodulator (which is implemented in the low-power logic) extracts the transitions representing the incoming message and feeds the result into a receive shift register. The demodulator consists of an amplifier and a Manchester decoder.

When the ESL "transmits", the diode is used as a device that mixes the (spread spectrum direct sequence modulated) signal received from the system transceiver (which is not modulated with any data) with the internal (10.7 MHz for example) oscillator signal, thereby generating two frequency components, one above and one below the received signal, each shifted by 10.7 MHz. Transmitted data is modulated by inverting the phase of the 10.7 MHz oscillator, thereby DBPSK (differential Binary Phase-Shift Keyed) modulating the reflective energy. The 10.7 MHz oscillator operates only during the transmission, conserving the energy source of the ESL. Stated differently, the 10.7 MHz oscillator is powered off when no label transmission is taking place.

The system transceiver receiver coherently correlates the received reflective signal with the same pseudo-random sequence used in the transmission from the (typically ceiling-mounted) transmit antenna. The received signal from the ESL (or tag) consists of the signal transmitted from the system transceiver multiplied by the 10.7 MHz DBFPK modulated data stream from the ESL. The signal from the (again typically ceiling-mounted) receive antenna is amplified in a low-noise amplifier, down-converted to an intermediate frequency (IF) by being mixed with the signal at the transmit antenna, and band-pass filtered. The mixing results in a correlation with the same pseudo-random sequence used to modulate the carrier. The correlated signal is converted to baseband, sampled and quantized, and processed using readily available Digital Signal Processor integrated circuits. DSP algorithms are used to extract bit and frame timing, carrier phase and frequency errors, and the ESL modulating information. Because the received signal is shifted by 10.7 MHz, the receive antenna may be located approximately closer to the transmitter than it would if the shift were by a smaller offset. Increasing the oscillator frequency allows even closer configurations, since the rejection of the transmitted signal becomes easier and less expensive. By carefully selecting the system parameters (ESL sub carrier, spreading sequence length, chip rate, and data rate), the system may be optimized for antenna design, antenna separation, and signal recovery. Proper selection of these parameters can significantly ease the restriction on installation configurations that would otherwise prevail.

DESCRIPTION OF THE DRAWING

The invention will be described with respect to a drawing in several figures, of which:

FIG. 9 shows a time line for important signals in the communications;

Where possible, like elements have been denoted with like reference numerals.

DETAILED DESCRIPTION

Figure 8:
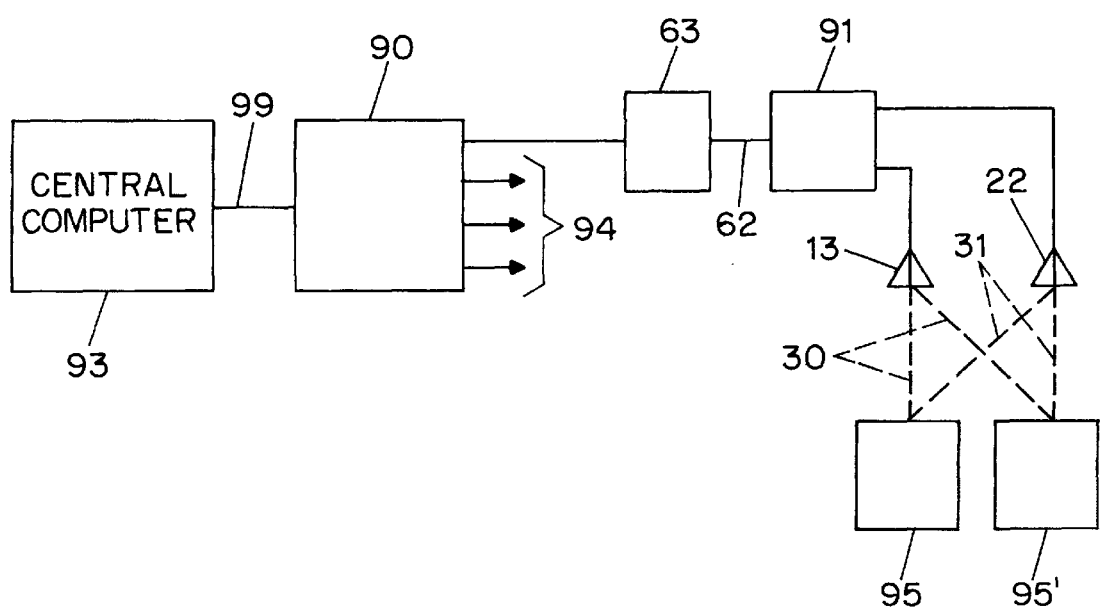
FIG. 8 shows in block diagram form exemplary components of the store electronic shelf label system.

The system according to the invention may perhaps be most clearly introduced by initial reference to FIG. 8. A multiplicity of electronic shelf labels 95, 95' etc. are dispersed throughout the store. Each ESL contains a liquid-crystal display, a processor, a battery, an antenna, and analog circuitry relating to sending and receiving information via the antenna. The terms "electronic shelf label" and "electronic price display" are used interchangeably herein.

The ESLs are controlled by a store central computer 93. The computer contains records indicative of the information (e.g. price) that is to be displayed by each label. The store is served by several pairs of antennas 13, 22 which effectively divide the store into "cells". Each cell is served by one pair of antennas 13, 22, each such pair is controlled by a controller 91, the controller 91 is connected by a cable 62 to a cable interface 63, and the several cable interfaces 63 (one for each cell) are connected via lines 94 to a multicell controller 90. The multicell controller is in turn communicatively coupled with the central computer 93 by a bidirectional link 99.

Figure 4:
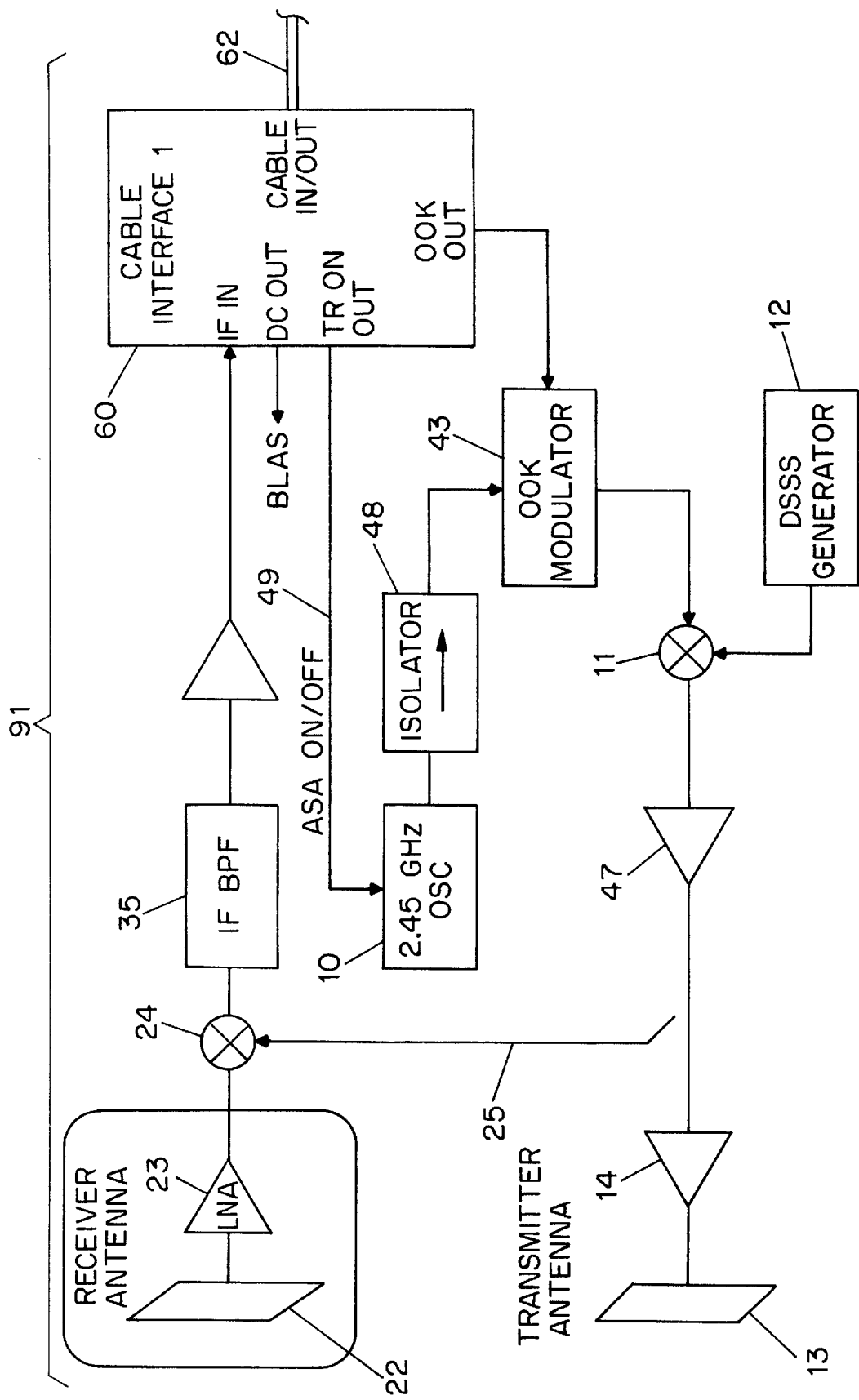
FIG. 4 shows in block diagram form the circuitry at one pair of receive and transmit antennas in the store ceiling.

The controllers 91 are shown in more detail in FIG. 4. The multicell controller 90 is shown in more detail in FIG. 7. The label 95 is shown in more detail in FIG. 6, and the interface chip 52 of FIG. 6 is shown in more detail in FIG. 5.

Figure 1:
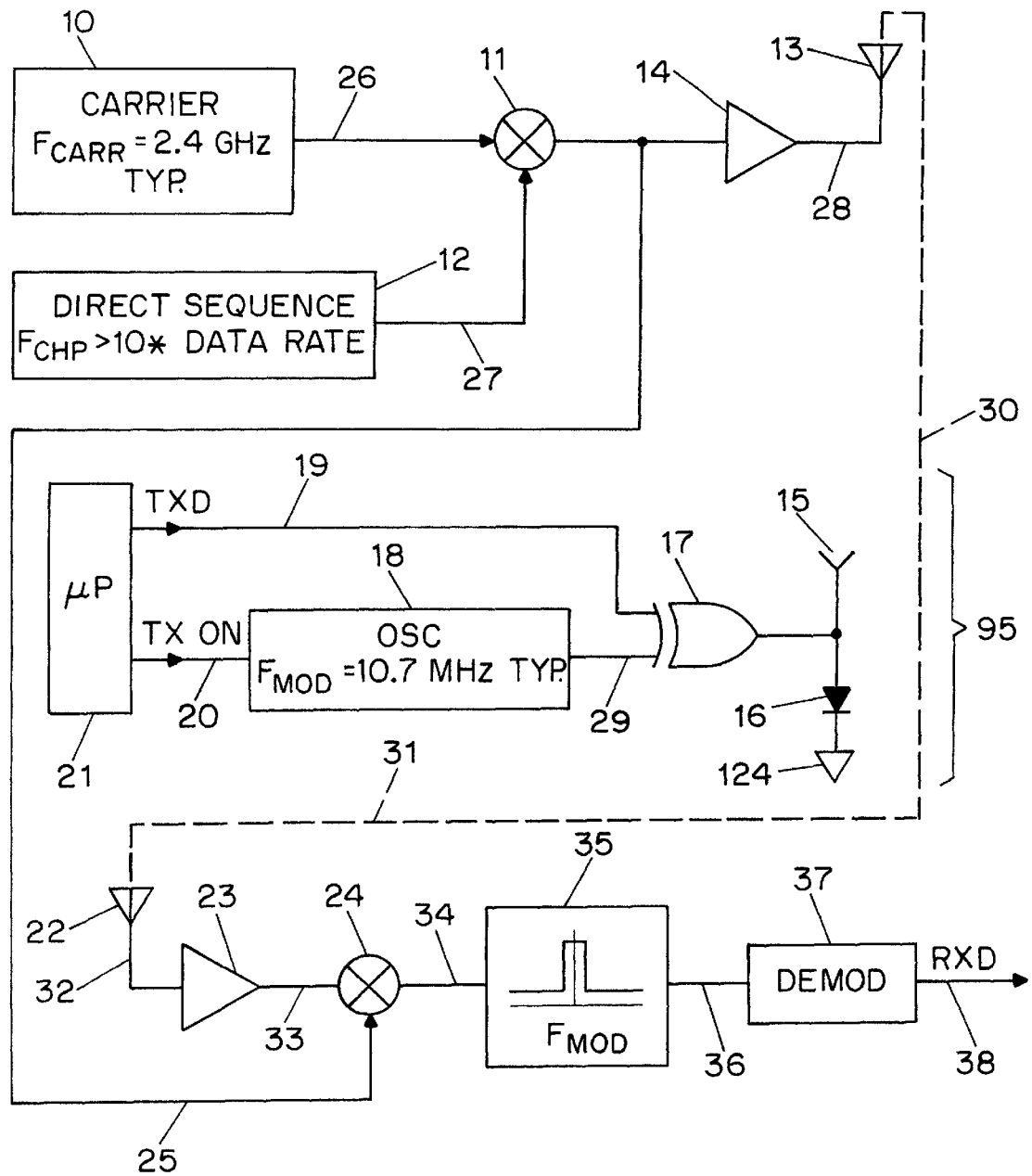
FIG. 1 shows in block diagram form the label transmit data path in one embodiment of the invention.

Turning now to FIG. 1, there is shown in block diagram form the label transmit data path in one embodiment of the invention. The goal for this data path is to communicate a data stream on line 19 (within the label 95) to the store central computer on received data line 38. This goal, as mentioned above, is to be accomplished consistent with minimizing power consumption in the label 95.

When it is desired for the label 95 to be able to communicate data, the transmit antenna 13 is energized. To this end, a carrier oscillator 10 is switched on, preferably at a frequency in the neighborhood of 2.4 Ghz. A sequence generator 12 is also switched on, generating a binary sequence used for direct sequence spread spectrum modulation. Typically the sequence would be N bits in length N>11, chosen such that it has "good" autocorrelation function. The clock rate or "chipping rate" for the sequence is chosen to be N times the data rate on line 19. The sequence signal on line 27 is used to control a binary phase-shift-keyed modulator mixer 11, which in simplified form may be thought of as a switch that selects either the signal on line 26 or the 180° phase-inverted form of the signal on line 26. The result is a well-known direct sequence spread spectrum (DSSS) RF signal. This signal is amplified by power amplifier 14 and the amplified signal on line 28 is broadcast into an area of the store by antenna 13.

Dotted line 30 denotes the RF energy coupled to antenna 15 through the air between the store transmit antenna 13 and the antenna 15 within the label 95. Generally this coupling would be line-of-sight propagation although reflection paths may sometimes yield the strongest coupling.

The label processor 21 turns on oscillator 18 via control line 20. Oscillator 18 provides an output on line 29, typically at 10.7 Mhz or possibly as low as 1 Mhz as mentioned above. An XOR gate 17 uses the transmit data line 19 to control the phase of the oscillator signal of line 29 to the diode 16 (preferably a Schottky or PIN diode). Working as an RF switch, the RF diode returns the incoming signal (or rather a fraction of it) to the antenna 15 in either one phase or the opposite phase. This switching occurs at a frequency equal to the ESL local oscillator 18, creating the two frequency components around the frequency of the incoming signal, removed from it by the switching frequency. The phase of these two spectral lines is Binary Phase Shift Keying (BPSK) modulated by the data.

The returned energy propagates along path 31 to receive antenna 22. When the data line 19 is inactive, the energy at antenna 22 carried along path 31 is nearly identical to that emitted at antenna 13, and is presumably dwarfed by the energy propagating directly from antenna 13 to antenna 22. When the data line 19 is active, however, then it is expected that the energy propagated along path 31 will be detectable due to its frequency offset.

The energy received at antenna 22 passes through a low-noise amplifier 23 and is then mixed in mixer 24 with the same signal (carried on line 25) that is being transmitted at antenna 13. This mixing serves two purposes. First, it acts as a conventional superheterodyne, yielding an intermediate frequency (IF) signal at 34 which is then processed by circuitry downstream. The superhet reception means that the downstream circuitry need not function at gigahertz levels, but instead need only function at the offset frequency which is only ten MHz or so. Second, it performs a spread-spectrum despreading, in the sense that the output 34 is a conventional-bandwidth signal rather than a spread-spectrum signal.

The IF signal on line 34 is passed through an IF bandpass filter centered at the offset frequency of the oscillator 18. The filter need not be too narrow, and desirably is not too narrow, so as to accommodate the data bandwidth and the frequency variations in the oscillators 18 of the various shelf labels. One important effect of the mixing and IF bandpassing is that virtually none of the energy coupled directly from antenna 13 to antenna 22 reaches line 36. This overcomes one of the traditional problems that arises when a transmitting antenna 13 is nearby to a receiving antenna 22, namely desensitization of the receiver at antenna 22.

The signal at line 36 is demodulated, and the resulting binary serial signal 38 is available to the store central computer.

It will be appreciated that the label 95 does not require much power to do all of this. Its oscillator 18 is powered only during transmit intervals and is unpowered at other times. Antenna 15 is merely returning energy from antenna 13 in either one phase or the opposite phase. What's more, none of the components in the label (save for the diode 16 and antenna 15) have to be capable of doing anything in the gigahertz range. The list of label components that have to function in the megahertz range is also quite short; it is the oscillator 18 and the gate 17.

Many classical spread-spectrum receivers have to go through a synchronization exercise to be able to receive a spread-spectrum signal. In the system shown in FIG. 1, however, the phase of the sequence from the generator 12 is known to the receiver (via line 25) so no spreading sequence synchronization exercise or circuitry is required. The direct sequence correlation is automatic and the DSSS demodulation is accomplished quite simply in the mixer 24.

It might be asked why one bothers to transmit a spread-spectrum signal at antenna 13, since theoretically the serial communication from line 19 to line 38 works just as well with a conventional-bandwidth (non-spread-spectrum) signal transmitted at antenna 13. If spread spectrum were eliminated, this would save having to provide the sequence generator 12 and the modulator 11, for example. But in a realistic store setting the RF power level that would be required to make the system of FIG. 1 work might be too high to satisfy regulatory requirements. Transmitting a signal that has been spread-spectrum modulated takes note of regulatory provisions that favor spread-spectrum use of the portion being utilized.

It will be appreciated by those skilled in the art that numerous spread-spectrum techniques are known which would, in the arrangement shown here, offer the benefits described. These techniques include frequency hopping and other phase-shifted modulations. But the direct sequency binary phase shift keyed modulation is thought to be simpler to implement.

Figure 2:
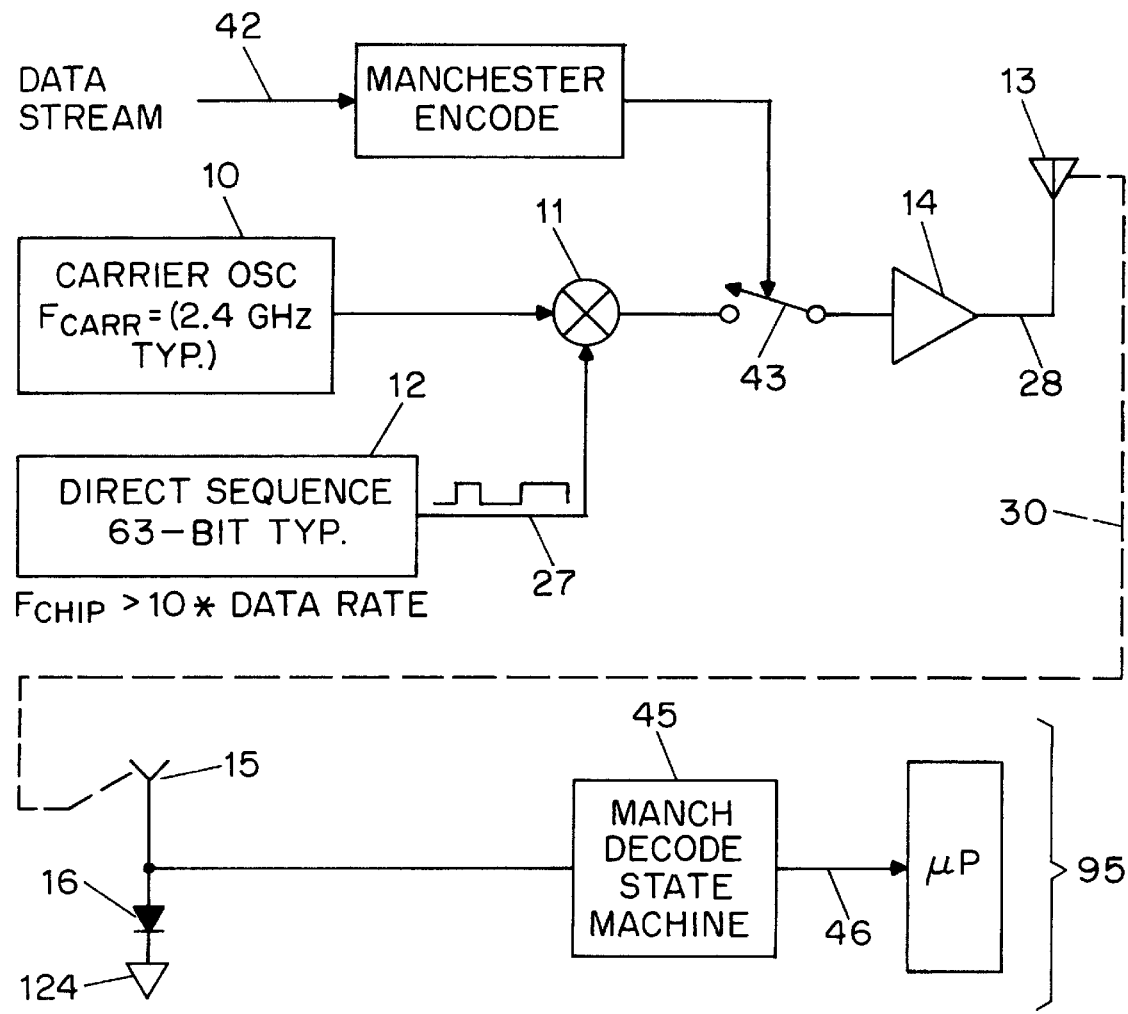
FIG. 2 shows in block diagram form the label receive data path.

FIG. 2 shows in block diagram form the label receive data path. The overall goal is to communicate a data stream on line 42 (from the store central computer) to line 46 (to be made available to the label processor 21). The spread-spectrum RF signal is provided as an input to switch 43. This is a 100% AM modulated signal, sometimes called an Of-Off keyed (OOK) signal. The signal is transmitted from antenna 13 and received at antenna 15 through coupling path 30. The detector diode 16 extracts RF energy from the antenna 15, and operates as a simple envelope detector. The detected signal is amplified, passed through a threshold device and Manchester decoded at 45 and made available to the processor 21 of the label 95.

Figure 3:
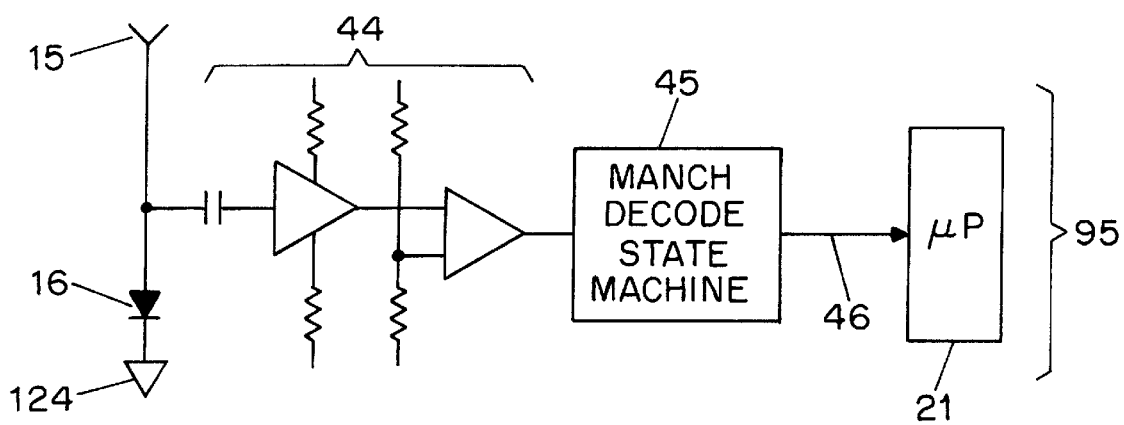
FIG. 3 shows an alternative embodiment for the label in FIG. 2.

FIG. 3 shows a more detailed depiction of the signal flow path of the label 95. The signal from the diode 16 and antenna 15 is capacitively coupled (to permit the amplifiers to operate from a single power supply) to an amplifier which is in turn connected with a comparator. The bias for the amplifier, and the threshold for the comparator, are both selected to be halfway between the power and ground levels in the label. The output, which has been implicitly envelope detected, is then Manchester decoded at 45. The use of capacitive coupling is what prompts Manchester encoding and decoding since there is no net bias toward a logic 1 or 0 in the data stream.

It will be appreciated that the arrangements of FIGS. 2 and 3 offer several benefits. First, they minimize the cost and complexity of the labels 95. The only circuit elements operating at the gigahertz level are the antenna 15 and diode 16. Everything downstream-of the diode 16 is essentially audio-frequency analog signal or digital binary signal.

To obtain these benefits one pays a price, of course. The first is that the "receiver", such as it is, of the label 95, is basically simply measuring in a relatively crude way the total RF energy impinging upon the antenna 15, and the acceptance bandwidth of the antenna is limited only by the antenna itself. For this reason the store layout is selected so that of the many antennas 13 in the ceiling, one is particularly close to the label 15. What's more, the multicell controller 90 is set up so that at any particular instant if an antenna 13 is transmitting, the antennas nearby to it (and perhaps all the other antennas 13 in the store) are silent. The threshold of the comparator within the Manchester decoder is set relatively high, so that the ambient store RF level does not register.

Here, too, one might ask why the trouble and expense of the spread spectrum modulation need to be incurred. If the SS modulation could be dispensed with, the generator 12 and modulator 11 could be eliminated, for example. Again, the design takes note of regulatory provisions that favor spread-spectrum modulation, since this promotes bandwidth reuse within a store and nearby to the store.

FIG. 4 shows in block diagram form the circuitry at one pair of receive and transmit antennas in the store ceiling. Carrier oscillator 10 may be seen, controlled by on/off control line 49. In this embodiment the on-off keying of the serial data signal takes placed in switch 43. (The serial data signal is received by the controller over line 62.) Next the RF signal, which has already had the serial data imposed upon it, is modulated with reference to the direct sequence signal from the generator 12. Binary Phase-Shift Keying modulator (or mixer) 11 spreads the energy of the RF signal over the spread-spectrum bandwidth. The spreaded signal is amplified and transmitted by antenna 13.

Still with reference to FIG. 4, the spread-spectrum signal is made available via line 25 for data reception. The received RF energy at antenna 22 is amplified and then mixed in mixer 24 as discussed in connection with FIG. 1. An IF bandpass filter 35 strips off the energy above and below the IF frequency. This signal is received at cable interface 60 and carried on cable 62. The controller 91 is one of many controllers 91 placed in the ceiling of the store, each with its transmit and receive antennas 13, 22.

Figure 4A:
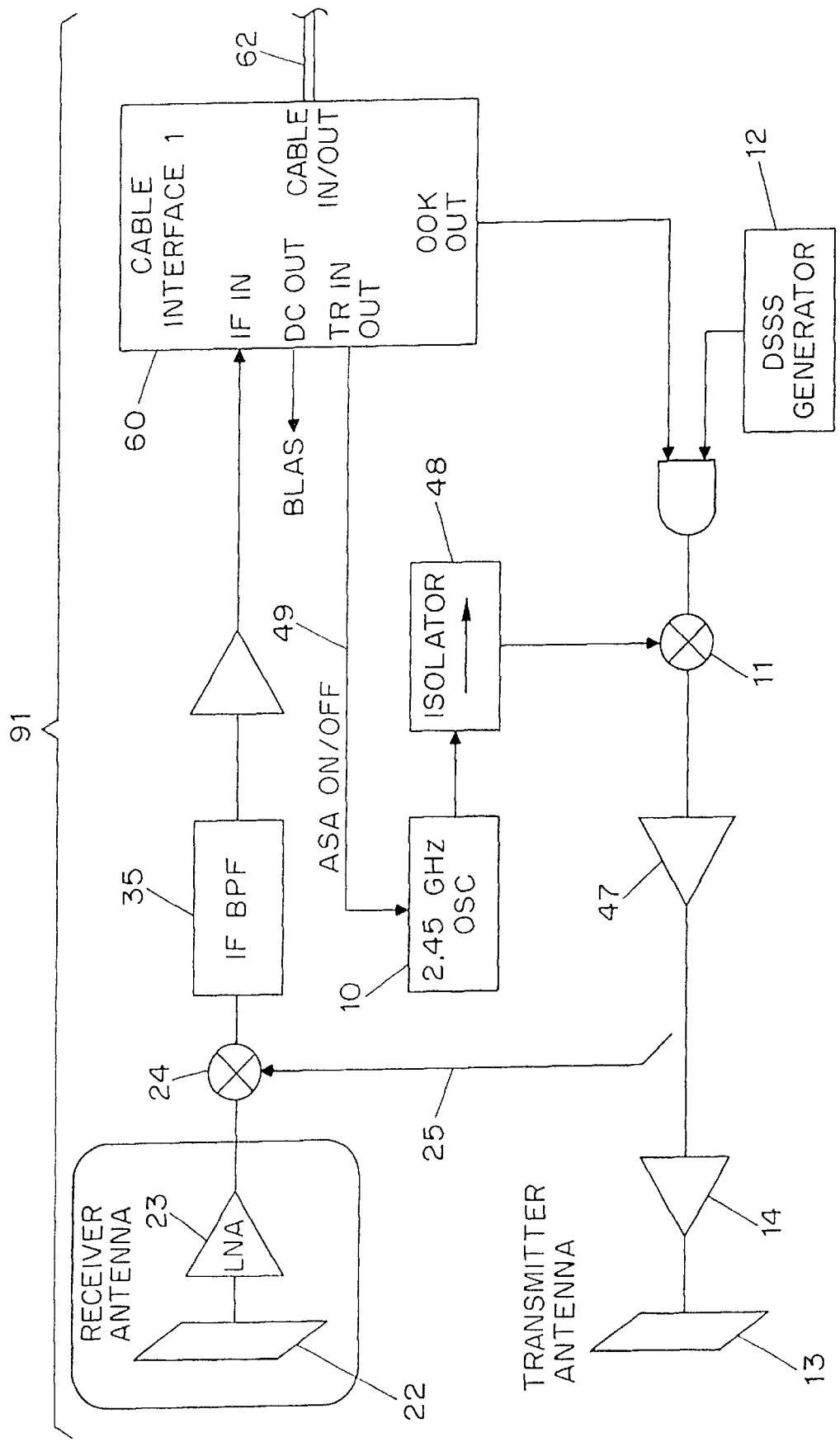
FIG. 4A shows in block diagram form an alternative embodiment for the circuitry at one pair of receive and transmit antennas in the store ceiling.

FIG. 4A shows an alternative embodiment for the ceiling cell site containing a transmit antenna 13 and a receive antenna 22. The carrier oscillator output is passed directly from isolator 48 to the BPSK mixer 11. The phase-control input to the mixer is the logical AND of the DSSS sequence and the on-off-keyed data stream.

Turning now to FIG. 6, what is shown in block diagram form is the circuitry of one electronic shelf label 95. A microcontroller chip 21, preferably such as the one made by Sanyo, controls the LCD display 120 and stores information to be displayed thereon. The offset oscillator 18 is also shown, controlled by line 20. Antenna 15 and nonlinear device 16 are also shown. Decoder chip 52 may also be seen. Omitted for clarity in FIG. 6 are a lithium battery, an optional customer pushbutton, and optional EEPROM memory. Various data and control lines also link the controller 21 and the decoder chip 52. As mentioned above the nonlinear element 16 is preferably a Schottky or PIN diode but could optionally be any of a wide range of two-terminal nonlinear devices capable of operation at microwave frequencies.

Figure 5:
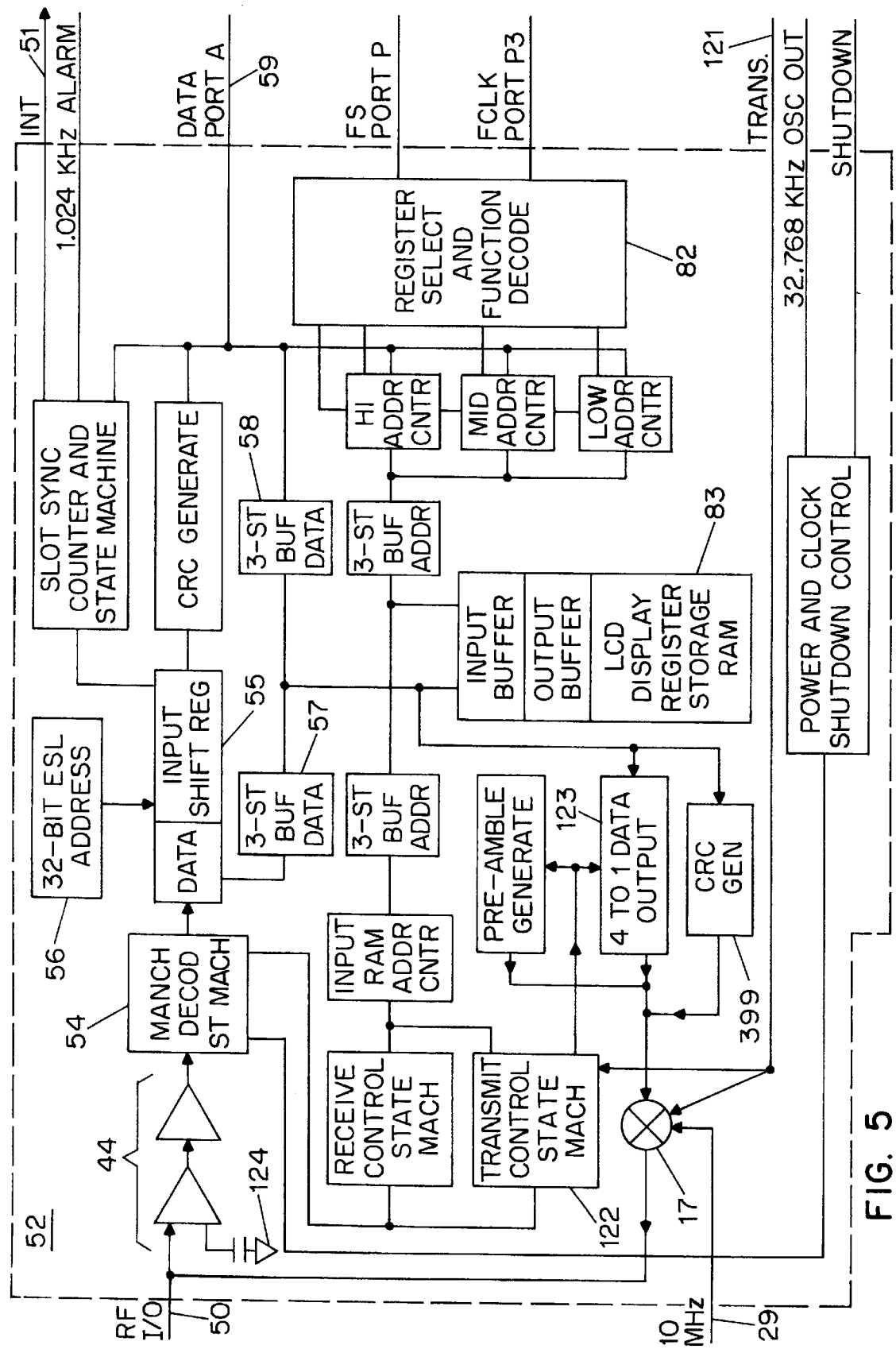
FIG. 5 shows in block diagram form part of the circuitry of one electronic shelf label.
Figure 6:
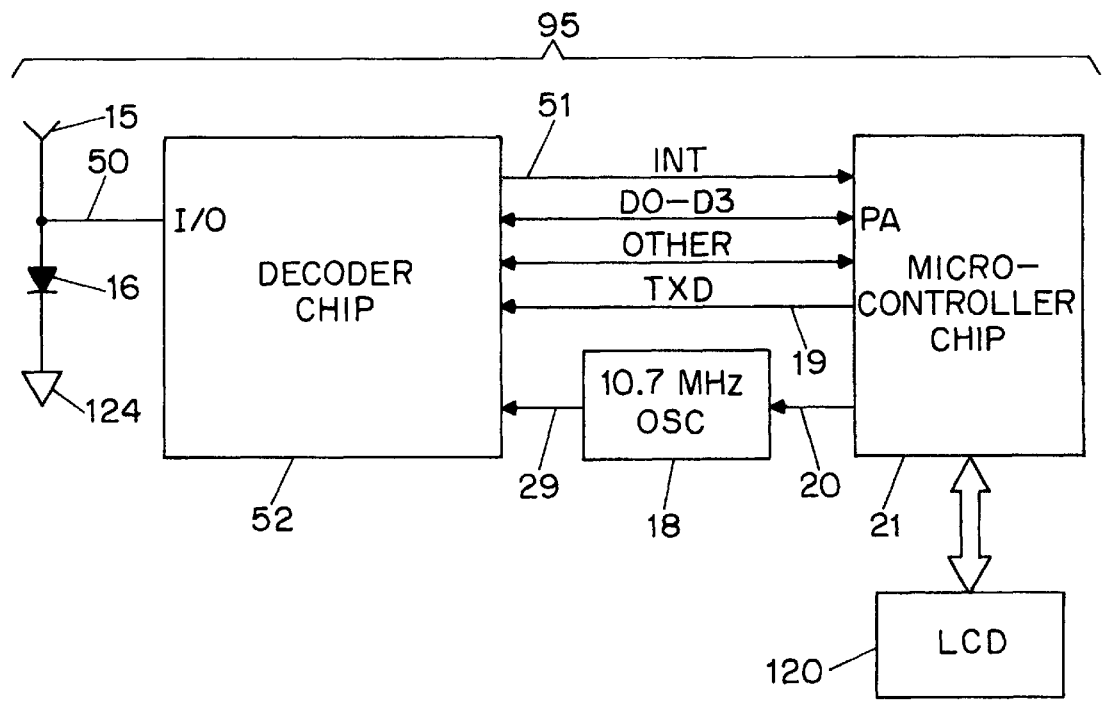
FIG. 6 shows in block diagram form all the circuitry of one electronic shelf label.

Turning now to FIG. 5, what is shown is the internal block diagram for the decoder chip 52. RF energy received at the antenna is envelope detected by the RF diode 16 (of FIG. 6) and communicated via line 50 to front end amplifier 44. Because the signal has been Manchester encoded, the signal may be capacitively coupled. Manchester decoder 54 is seen. Received data, depending on its content, is made available to the processor via data lines 59. The label transmit data path is also via bidirectional data lines 59, and tranmission is commenced by control line 121, which starts the transmit state machine 122. Under control of the state machine 122, the data to be sent are clocked out of shift register 123. A CRC generator 399 generates a CRC which is appended to the data, a step also controlled by the state machine 122.

Figure 7:
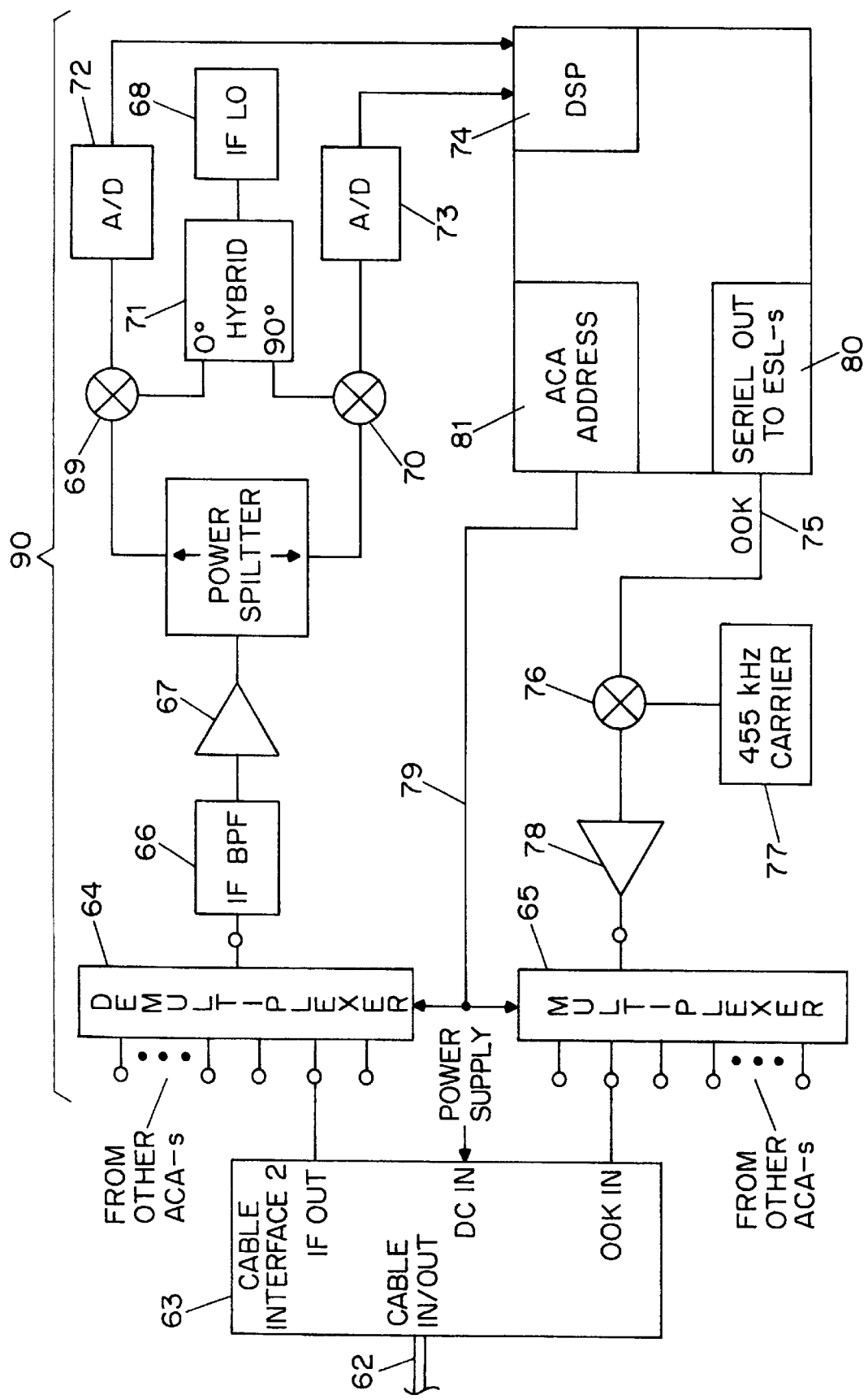
FIG. 7 shows in block diagram form the multiplexer/demultiplexer circuitry for the ceiling-mounted antennas.

FIG. 7 shows in block diagram form the multiplexer/demultiplexer and multicell controller circuitry for the ceiling-mounted antennas. Each of several cable interfaces 63 is connected to particular ports in multiplexer 65 and demultiplexer 64. Data bound from the central computer (omitted for clarity in FIG. 7) to the labels is sent via line 75 to one of the cell controllers. It is translated to an intermediate frequency of 455 kHz in order to enable the utilization of the cable 62 for a multiplicity of data paths. The received IF signal from a selected one of the cells is converted down to complex baseband signal after being filtered by IF bandpass filter 66, amplified and split into two components with amplifier 67 and a power splitter. Two mixers, 69 and 70 convert the IF signals into two quadrature components whereby they are sampled and quantized by the A/D (analog-to-digital) convertors 72 and 73. In this way both the amplitude and the phase of the IF signal are preserved in the sampled data.

The DSP (digital signal processor) uses these samples to syncronize and demodulate the received signal using digital signal processing algorithms that implement the operation of a packet modem.

The serial data from one of the labels 95 is then made available to the central computer.

FIG. 9 shows a time line for some important signals. Line 13 shows the RF power present at antenna 13. Bursts of power 101 on that line are detected within each label 95 and processed as serial digital signals 46 in each label. Most of the labels ignore the signal, as set by protocols discussed in applications incorporated herein by reference, namely Non-slidable Display Label, application Ser. No. 07/965,877, filed Oct. 23, 1992; Technique for communicating with electronic labels in an electronic price display system, application Ser. No. 07/995,048, filed Dec. 22, 1992; Electronic price display system with data bus isolation, application Ser. No. 08/008,200, filed Jan. 25, 1993; Technique for locating labels in an electronic price display system, application Ser. No. 08/031,580, filed Mar. 15, 1993; Information Display Rail System, application Ser. No. 08/036,950 filed Mar. 25, 1993; Electronic price display system with vertical rail, application Ser. No. 08/045,910, filed Apr. 12, 1993 issued as U.S. Pat. No. 5,348,485 on Sep. 20, 1994; Space Management System, application Ser. No. 08/114,510, filed Aug. 31, 1993; Electronic Shelf Label Location System, application Ser. No. 08/155,723, filed Nov. 22, 1993; Shelf Talker Management System, application Ser. No. 08/201,470, filed Feb. 24, 1994; Technique for locating electronic labels in an electronic price display system, application Ser. No. 08/207,956, filed Mar. 8, 1994; System for Locating Display Devices, application Ser. No. 08/210,046, filed Mar. 17, 1994; Display System with Section Addressability, application Ser. No. 08/210,163, filed Mar. 17, 1994; and Subglobal Area Addressing for Electronic Price Displays, application Ser. No. 08/247,334, filed May 23, 1994, all assigned to the same assignee as the assignee of the present application.

When the store central computer wishes to receive data from a label, it sends a command to that label instructing the label to respond. The label 95 prepares its response. The central computer then causes a non-data-modulated carrier 103 to be broadcast for an interval of time sufficient to permit the response from the label. During that interval 200, the label 95 turns on its oscillator 18, and sends the serial data stream 106 on line 19. This data stream DBPSK modulates the oscillator output at 29 and this modulated signal is applied to the diode, causing the reflected RF signal 104 to be different (offset) during the interval 200. During the time that both 103 and 200 exist, an offset signal is received at 22 and arrives at line 36 with the data modulating its phase 107. This signal is demodulated by 37 and the serial data 108 are produced at line 38.

Figure 10:
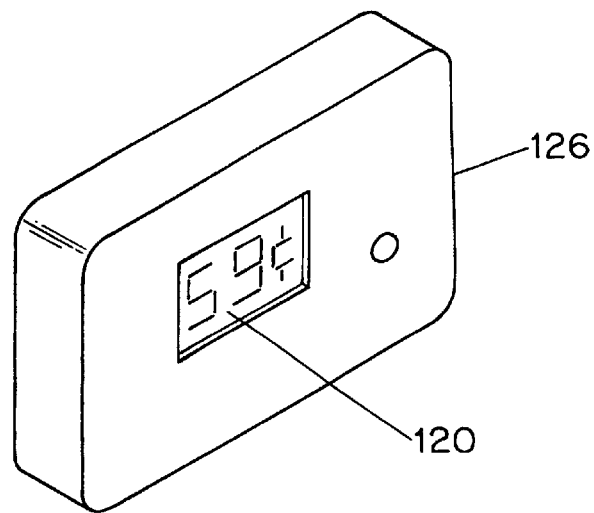
FIG. 10 shows a perspective view of a label according to the invention.
Figure 11:
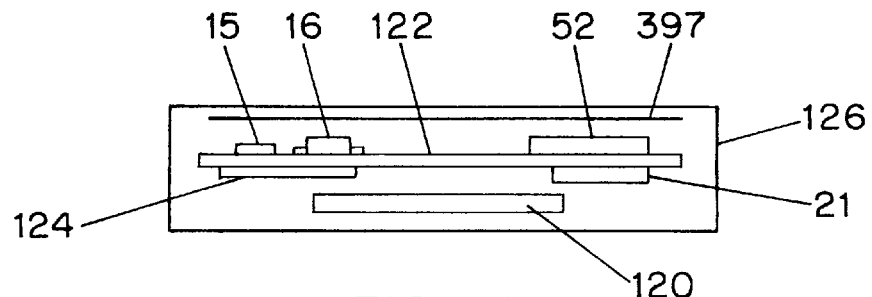
FIG. 11 shows a cross section of the label of FIG. 10.
Figure 12:
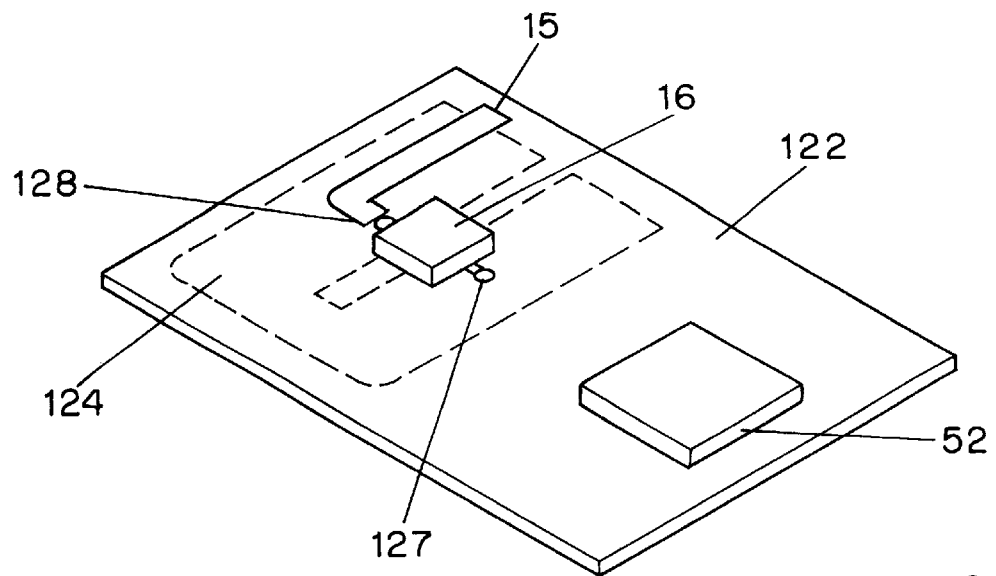
FIG. 12 shows in perspective view the main printed circuit board for the label of FIG. 10.

An antenna design for the label is shown in FIGS. 10, 11, and 12. FIG. 10 shows an electronic price display label with plastic case 126. The label may be mounted next to a relatively unpredictable variety of metal and plastic store shelves, and may be attached directly to a metal or plastic rail on the shelf edge. FIG. 11 shows a cross section of the label. The antenna, shown in exaggerated scale for clarity in FIG. 11, is at 15, with the diode 16 nearby. A slot antenna ground plane 124, also not shown to scale, appears on the other side of printed circuit board 122. One side of the PC board holds the digital signal extraction chip 52 (see FIG. 6) and the other side holds the microprocessor chip 21 (see FIG. 6). The liquid crystal display 120 is mounted at the front of the label. FIG. 12 shows in perspective view the portion of the PC board 122 containing the antenna 15. A slot ground plane 124 is on the lower face of the PC board. A feedthrough 127, preferably a plated feed-through, provides a connection from the ground plane 124 to the top side of the board 122, for connection with the diode 16. The ground reference is also made available to the signal extraction chip 52. The other end of the diode 16 is connected with a tuned stub antenna 15 and with an antenna feed line to the signal extraction chip 52. The physical structure just described comprises a slot antenna. The dimensions are selected for impedence and frequency matching. In an exemplary embodiment the ground plane is about 1 inch wide and 1.375 inches tall, with a 0.25 inch slot etched out in the center of the rectangle. The slot does not go all the way to the bottom of the rectangle but is nominally one-quarter of the wavelength of the carrier signal. The diode 16 is nominally about one-quarter inch up from the bottom of the slot. The position is sensitive and is empirically set with millimeter precision for impedance matching. The anode is connected to the antenna element, which is about one inch long. A reflector 397 made of thin metal is optionally placed at the rear of the label as shown in FIG. 11 to swamp out any variable effects from the rear such as metal shelving and the like. The reflector also allows fine-tuning the antenna and slot plane for desired propagation patterns that are repeatable even with varying mounting conditions.

Figure 13:
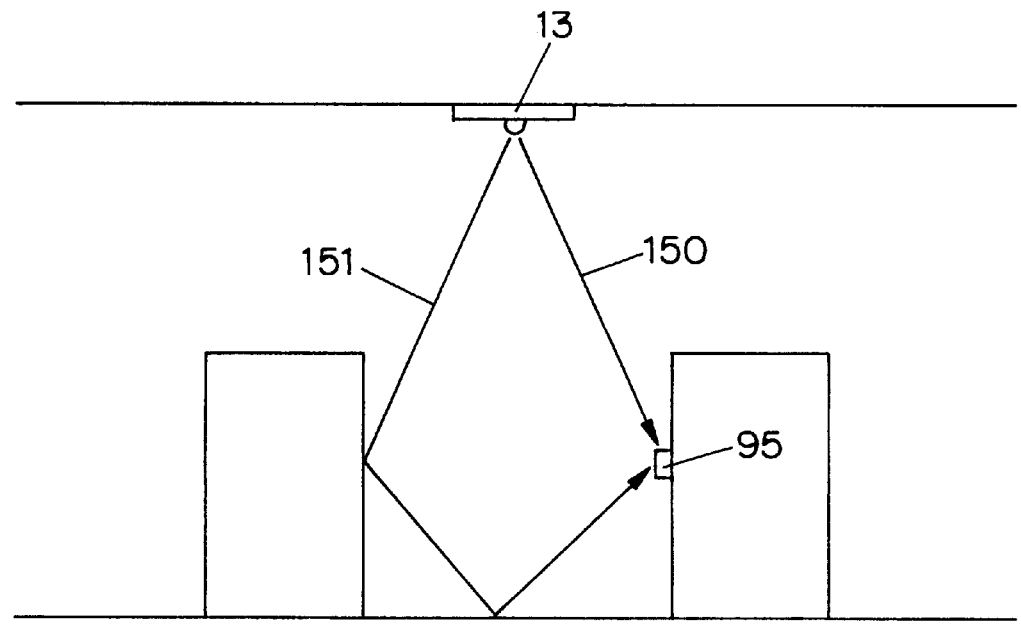
FIG. 13 shows a multipath model.

In an alternative embodiment of the invention, a provision is made to overcome multipath phenomena. Turning to FIG. 13, one model may be seen whereby a multipath problem could arise. The transmitting antenna 13, which is typically in the store ceiling, emits over a wide area from what is more or less a point source. Line 150 shows a straight-line propagation path from the antenna 13 to a typical label 95. Line 151 shows a possible second path of propagation from the antenna 13 to the label 95. If the difference in the two path lengths happens to be at or near a half-integral multiple of the transmit frequency, then there is the possibility of destructive interference. Since a typical frequency is 2.4 Ghz, the wavelength is about 0.13 meters or about five inches. Experience shows that the dimensions and surfaces present in a retail store can indeed provide nodes (areas where destructive interference occurs).

Figure 14:
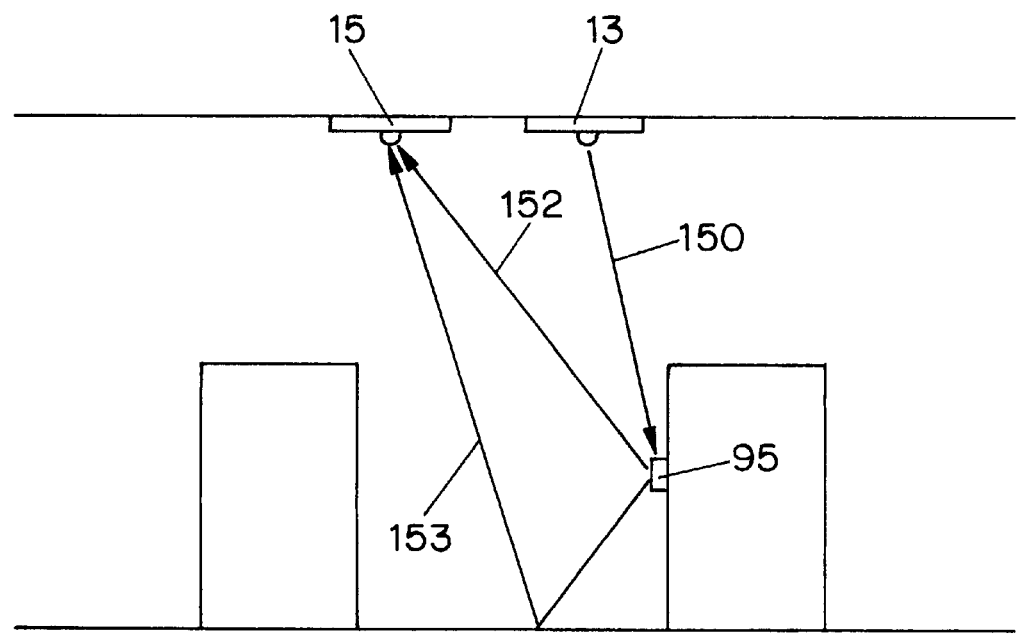
FIG. 14 shows a second multipath model.

FIG. 14 shows a second model for multipath interference. The signal reflected from a label 95 to the ceiling receiver 15 is, in the simple case, a straight-line signal 152. It is to be expected, however, that reflected paths 153 may present themselves, and that in some cases the difference in the path lengths may again be at or near a half-integral multiple of the return signal frequency. (It will be appreciated that the reflected energy is offset in frequency relative to the downlink energy so the relevant wavelength and/or wavelengths for multipath phenomena in the uplink are different than for the downlink.)

It will be noted that in a retail store, considering the wavelengths that are likely to be used, multipath interference is due to a mix of fixed and changing conditions. Fixed conditions include the locations of shelves, floor, and ceiling. Changing conditions include locations of merchandise, shopping cards, free-standing displays, and the like.

In many prior-art systems of this general type, the usual approach to multipath problems is to decrease the cell size and thus increase the area density of ceiling antennas, so that each label 95 is reachable by more than one ceiling antenna. When a label is unresponsive (which may be due to multipath or other causes), the system then tries a different cell antenna. The assumption is that the physical objects giving rise to the multipath effect will be unlikely to give rise to a multipath node for the different antenna. A second approach is to establish several different frequencies to be used for the downlink and/or uplink. Each frequency will, of course, have a different wavelength and thus will hopefully not suffer the same multipath loss as some other frequency might suffer. This approach, in many systems, is awkward because it requires coordination of frequencies in the ceiling site and in the label. The label must have hardware provisions for selection of uplink and downlink frequencies, as must the ceiling site. Some class of device (the ceiling site or the label) has to choose the frequency of the moment, and the other of the two devices has to be told what frequency is to be used, or has to stumble upon it by polling or some sort of synchronization schedule. This consumes some of the uplink and/or downlink bandwidth.

According to the invention, however, the multipath problem is readily remedied by the step of changing the transmit frequency generated by the transmit oscillator 10 (FIG. 4). Control line 49 includes information indicative of the desired transmit frequency, controlled by the store central computer or by distributed intelligence in the store. Returning to FIG. 1, it is noted that antennas 13, 15, and 22 are all fairly wideband; stated differently, there is nothing about the design requirements for the antennas that would call for any of the antennas to be narrowband. Furthermore, nothing about the circuitry of label 95 is particularly tied to the precise frequency from the oscillator 10. In other words, nothing about the label 95 has to change to accommodate the change in the frequency from the oscillator 10. Finally, since the energy received at ceiling antenna 22 is mixed with the energy of line 25 (the same signal that is transmitted at antenna 13), then nothing about the receive signal path 22, 32, 23, 24, 35 has to change to accommodate the change in the frequency of the transmit oscillator 10.

It will thus be appreciated that remedying multipath problems is much easier in the system of the invention, as compared with other prior art systems.

Consider, then, what happens if the store computer 93 (FIG. 8) wants to communicate a message to a label 95. The message is sent via the downlink path, shown as 30 in FIG. 1 or as 150/151 in FIG. 13. The label is then asked to respond, and the response is propagated via the uplink path, shown as 31 in FIG. 1 or as 152/153 in FIG. 14. Experience suggests that multipath will be encountered in only about 15% or less of instances. If there is no response, this may be due to uplink multipath, downlink multipath, or due to something else. The store computer then commands the oscillator 10 to shift to a new frequency, and the two-way communication is again attempted. Experience suggests that in only about 15% or less of instances will this link also fail due to multipath. Thus in two tries there is only about a 2% likelihood of multipath interfering with both tries. A shift to a third frequency from oscillator 10 is quite likely to overcome that residue of unsuccessful communication attempts.

It is important to note the benefits of the system according to the invention. For example, the shifts in frequency of the oscillator 10 need not be particularly closely fixed. That is, the shift could be substantially more or less than some nominal shift, and communciation would still take place. As mentioned above, this is due to (1) the relatively wideband nature of the signal paths; (2) the absence of any particular frequency dependence or tuning in the label 95; and (3) the fact that the receive path uses mixing at 24 based on the transmitted signal of line 25, thus canceling out any drift or lack of repeatability in the frequency shift of oscillator 10.

If desired, the store central computer 93 (FIG. 8) can keep note, for each label, of the frequency that worked the last time the label was communicated with. Subsequent attempts to reach a particular label can start using the frequency that worked last time. (It is to be noted that there is no assurance a particular frequency will work with a label a second time, since shopping cards, merchandise, and other items may move in the interim.)

Those skilled in the art will appreciate that what has been described is a frequency-agile system for uplink and downlink communciations between ceiling-mounted antenna (or plurality of antennas) and one or more electronic price display labels, in which the downlink and uplink frequencies all shift by some offset amount, and yet no hardware change is required in the label or in the ceiling receive signal path to accommodate the shift, and the only hardware variation required is a shift in the output frequency of the ceiling transmit oscillator 10. In particular nothing about the label has to explicitly provide for such shifts, nor does any intelligence in the label need to be aware that such shifts have ocurred; this furthers the general goal of cost-reducing the labels to the greatest extent possible. Those skilled in the art will appreciate further that this represents an exceedingly inexpensive and hardware-efficient approach to remedying multipath interference problems, especially when compared with prior art approaches to the problems.

Alternatively the central computer can simply always try a particular frequency first for all labels, and then shift to a second frequency for any labels that failed to respond to the first frequency, and so on.

Those skilled in the art will appreciate that numerous obvious modifications and variations could be made to the invention without departing from it in any way. All these obvious modifications and variations are intended to be encompassed within the scope of the claims.

What is claimed is:

1. A communications system for communicating a serial data stream from a first device to a second device, the first and second device being physically separate from each other;

the second device comprising a transmitter transmitting an RF signal modulated by a spread-spectrum modulation;

the first device comprising an antenna coupled to a two-terminal nonlinear component, an oscillator, the oscillator having an output defining an offset frequency; and a mixer responsive to the serial data stream for selectively coupling the oscillator output to the nonlinear component in response thereto; and the second device further comprising a receiver receiving RF energy present at a sideband offset from the transmitted signal by the offset frequency, and a spread-spectrum demodulator demodulating the received RF energy with respect to the spread-spectrum modulation of the transmitter, and a second demodulator demodulating the demodulated signal, yielding the serial data stream.

2. The system of claim 1 wherein the spread-spectrum modulation is direct sequence modulation, wherein the transmitter further comprises a sequence generator with an output, the sequence output controlling a first phase inverter which selectively inverts the phase of the transmitted RF signal.

3. The system of claim 1 wherein the spread-spectrum modulation is frequency-hopping modulation.

4. The system of claim 3 wherein the spread-spectrum demodulator demodulates the received signal by mixing the transmitted RF signal with the received RF signal.

5. The system of claim 4 further comprising an intermediate-frequency bandpass filter filtering the output of the mixer.

6. A method for communicating a serial data stream from a first device at which the serial data stream originates to a second device, the first and second device being physically separate from each other, the first device compising an antenna and a nonlinear component coupled thereto, the method comprising the steps of:

generating at the second device a spread-spectrum modulation;

transmitting from the second device an RF signal modulated by the spread-spectrum modulation;

receiving energy of the spread-spectrum-modulated RF signal at the antenna of the first device;

generating at the first device an offset signal at a frequency defining an offset frequency;

selectively coupling at the first device the offset signal to the nonlinear component in response to the serial data stream;

receiving at the second device RF energy at a sideband offset from the transmitted signal by the offset frequency;

spread-spectrum demodulating at the second device the received RF energy with respect to the spread-spectrum modulation generated at the second device; and further demodulating the demodulated signal at the second device, yielding at the second device the serial data stream that originated at the first device.

7. The method of claim 6 wherein the spread-spectrum modulation is direct sequence modulation, wherein the transmitter further comprises a sequence generator with an output, the sequence output controlling a first phase inverter which selectively inverts the phase of the transmitted RF signal, yielding the RF signal modulated by the spread-spectrum modulation.

8. The method of claim 6 wherein the spread-spectrum modulation generated at the second device is frequency-hopping modulation.

9. The method of claim 8 wherein the spread-spectrum demodulation at the second device is performed by mixing the transmitted RF signal at the second device with the received RF signal from the first device.

10. The method of claim 9 further comprising the step, performed after the spread-spectrum demodulation step, of filtering the output of the mixing through an intermediate-frequency bandpass filter.

* * * * *